United States Patent
Nilsson et al.

(10) Patent No.: US 12,518,419 B2
(45) Date of Patent: Jan. 6, 2026

(54) METHOD, SOFTWARE PRODUCT, DEVICE AND SYSTEM FOR DETERMINING A DIRECTION AT A POSITION

(71) Applicant: SAAB AB, Linköping (SE)

(72) Inventors: Linnea Nilsson, Karlskoga (SE); Jimmy Jonsson, Linköping (SE); Per-Olof Persson, Karlskoga (SE)

(73) Assignee: SAAB AB, Linköping (SE)

( * ) Notice: Subject to any disclaimer, the term of this patent is extended or adjusted under 35 U.S.C. 154(b) by 157 days.

(21) Appl. No.: 18/553,101

(22) PCT Filed: Mar. 29, 2022

(86) PCT No.: PCT/SE2022/050304
§ 371 (c)(1),
(2) Date: Sep. 28, 2023

(87) PCT Pub. No.: WO2022/211708
PCT Pub. Date: Oct. 6, 2022

(65) Prior Publication Data
US 2024/0202968 A1    Jun. 20, 2024

(30) Foreign Application Priority Data
Mar. 30, 2021 (SE) .................................. 2100043-5

(51) Int. Cl.
*G06T 7/73* (2017.01)
*F41G 3/22* (2006.01)
(Continued)

(52) U.S. Cl.
CPC .................. *G06T 7/73* (2017.01); *F41G 3/22* (2013.01); *G06V 10/776* (2022.01); *G06V 20/13* (2022.01);
(Continued)

(58) Field of Classification Search
None
See application file for complete search history.

(56) References Cited

U.S. PATENT DOCUMENTS 8,427,536 B2  4/2013  Jiang et al.
9,830,706 B2  11/2017 Hernandez et al.
(Continued)

FOREIGN PATENT DOCUMENTS

CN        110009571 A    7/2019
WO    WO 2015/011696 A1  1/2015
(Continued)

OTHER PUBLICATIONS

Extended European Search Report for Application No. 22781754.1, dated Jan. 9, 2025, 9 pages.
(Continued)

*Primary Examiner* — James M Anderson, II
(74) *Attorney, Agent, or Firm* — Alston & Bird LLP

(57) ABSTRACT

A method for determining a direction at a position is provided. The method involves obtaining an orthorectified photo of a region of Earth's surface comprising the position, and a coordinate system for the orthorectified photo; identifying the position in the orthorectified photo; identifying a reference object in the orthorectified photo; determining a reference direction between the position and the identified reference object; capturing at least one digital photo at the position with a calibrated digital camera, wherein at least one of the at least one captured digital photo depicts the reference object; and determining the direction based on the at least one captured digital photo and the determined reference direction, wherein the determined direction is based on at least one pixel coordinate corresponding to the depicted reference object in the at least one captured digital photo depicting the reference object.

13 Claims, 4 Drawing Sheets

(51) Int. Cl.
  *G06V 10/776* (2022.01)
  *G06V 20/13* (2022.01)
  *G06V 20/56* (2022.01)
  *H04N 23/695* (2023.01)
  *H04N 23/90* (2023.01)
  *F41G 3/02* (2006.01)

(52) U.S. Cl.
  CPC ........... *G06V 20/56* (2022.01); *H04N 23/695* (2023.01); *H04N 23/90* (2023.01); *F41G 3/02* (2013.01); *G06T 2207/10032* (2013.01); *G06T 2207/30184* (2013.01); *G06T 2207/30244* (2013.01); *G06T 2207/30252* (2013.01)

(56) References Cited

U.S. PATENT DOCUMENTS

| | | | |
|---|---|---|---|
| 2011/0115902 A1* | 5/2011 | Jiang | H04W 4/026 348/E7.091 |
| 2014/0016821 A1 | 1/2014 | Arth et al. | |
| 2017/0084037 A1* | 3/2017 | Barajas Hernandez | G06V 10/462 |
| 2019/0033459 A1 | 1/2019 | Tisdale et al. | |
| 2021/0123717 A1* | 4/2021 | Wierda | G06T 7/70 |
| 2023/0236037 A1* | 7/2023 | Heilbron | G08G 1/096758 701/422 |

FOREIGN PATENT DOCUMENTS

| | | |
|---|---|---|
| WO | WO 2015/049675 A1 | 4/2015 |
| WO | WO 2020/099855 A2 | 5/2020 |

OTHER PUBLICATIONS

Tournaire, et al., "Towards a Sub-Decimetric Georeferencing of Ground-Based Mobile Mapping Systems in Urban Areas: Matching Ground-Based and Aerial-Based Imagery Using Roadmarks", *Revue Francaise De Photogrammetrie et de Teledetection*, vol. 185, pp. 84-89, Mar. 31, 2007.

International Searching Authority, International Search Report and Written Opinion received for International Application No. PCT/SE2022/050304, dated May 11, 2022, 16 pages, Swedish Patent and Registration Office, Sweden.

Swedish Patent and Registration Office, Search Report received for Application No. 2100043-5, Dated Dec. 13, 2021, 3 pages, Sweden.

* cited by examiner

METHOD, SOFTWARE PRODUCT, DEVICE AND SYSTEM FOR DETERMINING A DIRECTION AT A POSITION

CROSS REFERENCE TO RELATED APPLICATIONS

This application is a National Stage Application, filed under 35 U.S.C. § 371, of International Application No. PCT/SE2022/050304, filed Mar. 29, 2022, which international application claims priority to and the benefit of Swedish Application No. 2100043-5, filed Mar. 30, 2021; the contents of both of which as are hereby incorporated by reference in their entirety.

BACKGROUND

Related Field

The present disclosure relates to determining direction with electronic devices.

Description of Related Art

The ability to determine directions towards the cardinal directions or towards a detected object has been of critical importance in order to navigate and localize objects. Historically techniques to determine the bearing at a position utilized visible stellar objects, such as the Sun or Polaris (Alpha Ursae Minoris).

One type of applications where determining an accurate direction quickly is of critical importance is for weapon aiming systems, such as the indirect fire aiming system for an artillery piece. Typically the weapon aiming system of such an indirect fire weapon does not directly observe its target but instead obtains information indicative of the target from a second unit, such as a forward observer that is in line-of-sight with the target. In order for a forward observer to provide meaningful target information to the weapon aiming system both typically may need to determine their own orientation and/or position in a common coordinate system, and the forward observer typically needs to determine target information, such as direction and/or distance to target, in relationship to its own orientation and/or position.

Several solutions exist that aim to determine an orientation or a direction towards some object in a coordinate system used by two of more parties. However, existing solutions are either too inaccurate or too slow for applications such as weapons aiming, or are too cumbersome for users on foot.

There exists a need to improve determining a direction at a position.

BRIEF SUMMARY

One object of the invention is to improve the ability to autonomously determine a direction.

The disclosure proposes a method for determining a direction at a position. The method comprises
- obtaining an orthorectified photo of a region of Earth's surface comprising the position, and a corresponding coordinate system for the region in said orthorectified photo;
- identifying the position in the orthorectified photo, thereby determining a set of coordinates corresponding to the position;
- identifying a reference object in the orthorectified photo, thereby determining a set of coordinates corresponding to the reference object;
- determining a reference direction between the position and the identified reference object based on the corresponding sets of coordinates;
- capturing at least one digital photo at the position with a calibrated digital camera, wherein at least one of the at least one captured digital photo depicts the reference object; and
- determining the direction based on the at least one captured digital photo and the determined reference direction.

The determined direction is based on at least one pixel's coordinates corresponding to the depicted reference object in the at least one captured digital photo depicting the reference object.

This has the advantage of allowing a direction, such as the north direction, at the position to quickly be determined by capturing one digital image depicting the reference object.

A second embodiment is based on the first embodiment further comprising selecting a pixel in the at least one captured digital photo corresponding to the direction to be determined, such as a pixel corresponding to a depicted target object, and wherein determining a direction further comprises utilizing the selected pixel to determine a direction corresponding to said pixel. Determining the direction is based on the at least one captured digital photo and the reference direction, wherein determining a direction utilizes the pixel corresponding to the depicted reference object in said captured digital photo.

This has the advantage of allowing a direction from the position to a target object depicted in a digital photo to be determined based on a photo depicting the reference object and the target object.

A third embodiment is based on the second embodiment wherein capturing at least one digital photo comprises obtaining for each captured digital photo a relative camera orientation, and wherein, if the selected pixel is in a digital photo lacking a depiction of the reference object, determining the direction corresponding to said selected pixel is further based on said obtained relative camera orientations of said photo and at least one of the at least one captured digital photo depicting the reference object.

This has the advantage of allowing a direction from the position to a target object depicted in a digital photo to be determined based on a digital photo depicting the reference object and a digital photo depicting the target object.

A fourth embodiment is based on the first embodiment further comprising identifying at least one additional depicted reference object further comprising determining for each identified additional depicted reference object a reference direction, and wherein determining a direction is further based on the at least one additional depicted reference object and corresponding determined reference direction(s), and/or based on the determined reference direction.

This has the advantage of allowing an additional reference object and its corresponding reference direction to be utilized to determine a direction, thereby allowing an improved reliability and/or increased options for determining a direction.

A fifth embodiment is based on the first embodiment wherein capturing at least one digital photo further comprises at least obtaining range data corresponding to the reference object, and wherein the method further comprises validating the reference object by comparing the reference object depicted in at least one digital photo and the orthorectified photo based on the corresponding range data.

This has the advantage of allowing an improved reliability that reference object identified in the orthorectified photo corresponds to the reference object in the captured digital photo. For obtained range data further corresponding to a target object this may further have the advantage of allowing determination of a direction to and a distance from the position to said target object depicted in a photo.

The present disclosure also relates to a computer program product comprising a non-transitory computer-readable storage medium having thereon a computer program comprising program instructions. The computer program being loadable into a processor and configured to cause the processor to perform the method according to what is presented herein.

The computer program corresponds to the steps performed by the method discussed above and have all the associated effects and advantages of the disclosed method.

The present disclosure also relates to a system for determining a direction at a position. The system comprises a computer, a memory storage, and a camera arrangement comprising a digital camera. The digital camera is a calibrated digital camera arranged to capture digital photos. The camera arrangement is arranged to determine a relative orientation of the digital camera during capture. The memory storage comprises at least one orthorectified photo of a region of Earth's surface and corresponding coordinate system for the region in said orthorectified photo. The computer is arranged to obtain an orthorectified photo of a region of Earth's surface and a corresponding coordinate system for the region in said orthorectified photo;

determine the position in the orthorectified photo, thereby determining a set of coordinates corresponding to the position;

identify a reference object in the orthorectified photo, thereby determining a set of coordinates corresponding to the identified reference object;

determine a reference direction between the position and the identified reference object based on the corresponding sets of coordinates;

capture and obtain at least one digital photo at the position by controlling the digital camera;

and upon obtaining at least one captured digital photo depicting the reference object, determine the direction based on said captured digital photo and the reference direction. Determining the direction is based on pixel coordinates of at least one pixel corresponding to the depicted reference object in said captured digital photo, and the determined reference direction.

This has the advantage of allowing a direction, such as the north direction, and/or a direction from the position to a target object depicted in a digital photo of the obtained at least one digital photo at the position to be determined with a low weight system.

In some embodiments the system further comprises camera orientation means. The camera orientation means are arrange to orient and provide the relative orientation of the digital camera, and the computer is arranged to control the orientation means.

This has the advantage of allowing the digital camera orientation and capture of digital photos to be controlled by the computer, thereby allowing the photo capture process to be executed without a human present at the digital camera.

In some embodiments the system further comprising a rangefinder, such as a laser rangefinder. The rangefinder is arranged to provide range data indicative of the distance to objects in the field of view of the digital camera for a digital photo. The computer is arranged to validate the depicted reference object by comparing the depicted reference object in at least one digital photo and the identified reference object in the orthorectified photo based on the corresponding range data.

This has the advantage of adding a technique to gather range data suitable for verifying that the identified reference object in the orthorectified photo is the same as the reference object depicted in the digital photo. This further has the advantage of allowing the system to provide the direction towards a target object depicted in a photo from the position and a distance from the position to said target object based on ranged data from the rangefinder.

In some embodiments the system further comprising down detection means of the digital camera arranged to provide a downward direction, such as a direction towards the centre of mass of Earth, to the computer. The computer is arranged to determine the relative orientation of the digital camera based on said downward direction, and/or the computer is arranged to determine the direction based on said downward direction.

This has the advantage of improving determination of the relative orientation of the digital camera during capture. This further has an advantage of improving the computers performance in determining the direction. In embodiments wherein the down detection means provide a downward direction indicative of the direction towards the centre of mass of Earth the downward direction may be utilized to a improve the accuracy of the altitude of the determined direction. Typically the direction towards the centre of mass of Earth has a known relationship with the coordinate system used to describe the direction determined at the position.

In some embodiments the system comprising a plurality of digital cameras, wherein at least two digital cameras are arranged in a fixed relative orientation in relation to each other.

This has the advantage of allowing the system to capture a plurality of digital photos simultaneously, thereby simplifying the determination of the direction for digital photos captured from a moving platform as a plurality of photos are captured from substantially the same position. This further has the advantage of allowing digital photos to be captured simultaneously by digital cameras with known relative orientation, thus allowing for simpler and more robust systems such as a system for mounting on a drone.

The term position herein refers to the place from which a direction is to be determined. The position for determining a direction is typically one position from which the digital camera captures the at least one digital photo. In some examples multiple digital photos are captured in rapid succession from a moving platform, whereby the position at which digital photos are captured at may be understood as a plurality of positions, and whereby the position at which the direction is determined may be understood as one of said plurality of positions.

The term direction herein refers to an absolute direction in a coordinate system agreed upon by at least two parties, such as a geographic coordinate system. Typically said coordinate system is a global coordinate system, such as the geographic coordinate system associated with positions on Earth. In some examples the direction is determined for the direction the camera was oriented in while capturing a digital photo. In some examples the direction is determined for a line passing through a position where a digital photo was captured and an object depicted in said digital photo.

The term orthorectified photo herein refers to imagery representing an aerial view of a surface. Orthorectified photos are typically based on aerial photography or satellite imagery. Typically an orthorectified photo is geometrically correct with a uniform scale. In some examples the orthorectified photo further comprises a scale, a north direction and map coordinates, wherein said map coordinates are in a coordinate system that is relatable, and preferably the same, as the coordinate system used for the direction to be determined. In some examples the orthorectified photo further comprises height information. In some examples the orthorectified photo further comprises meta-data for depicted objects, such as landmarks.

The term reference object herein refers to an object identifiably in an obtained orthorectified photo. Typically the identified reference object corresponds to the landmark with a high probability of being visible from the position of capturing a digital photo. The reference object may correspond to landmarks with clear silhouette, such as communication towers, water towers, skyscrapers, and chimneys.

The term calibrated digital camera herein refers to a camera device for which the optical properties and sensor properties are known. With a calibrated digital camera the direction of light incident on a specific area corresponding to a pixel of a sensor, such as a charge-coupled device (CCD) image sensor, may be determined in relationship to the camera orientation. It should be understood that the calibrated digital camera remains calibrated when camera settings are intentionally changed, such as operating a zoom lens, assuming said intentional changes are taken into account when determining a direction.

The term relative camera orientation herein refers to the orientation of the digital camera relative to any object substantially stationary in the environment. In some examples the digital camera is mounted onto a stationary stand, whereby the relative camera orientation for captured digital photos may be described in relation to said stand. In some examples two digital camera are mounted on a vehicle, whereby the relative camera orientation for two digital photos simultaneously captured may be described in relation to the forward direction of said vehicle.

DETAILED DESCRIPTION OF VARIOUS EMBODIMENTS

Figure 1:
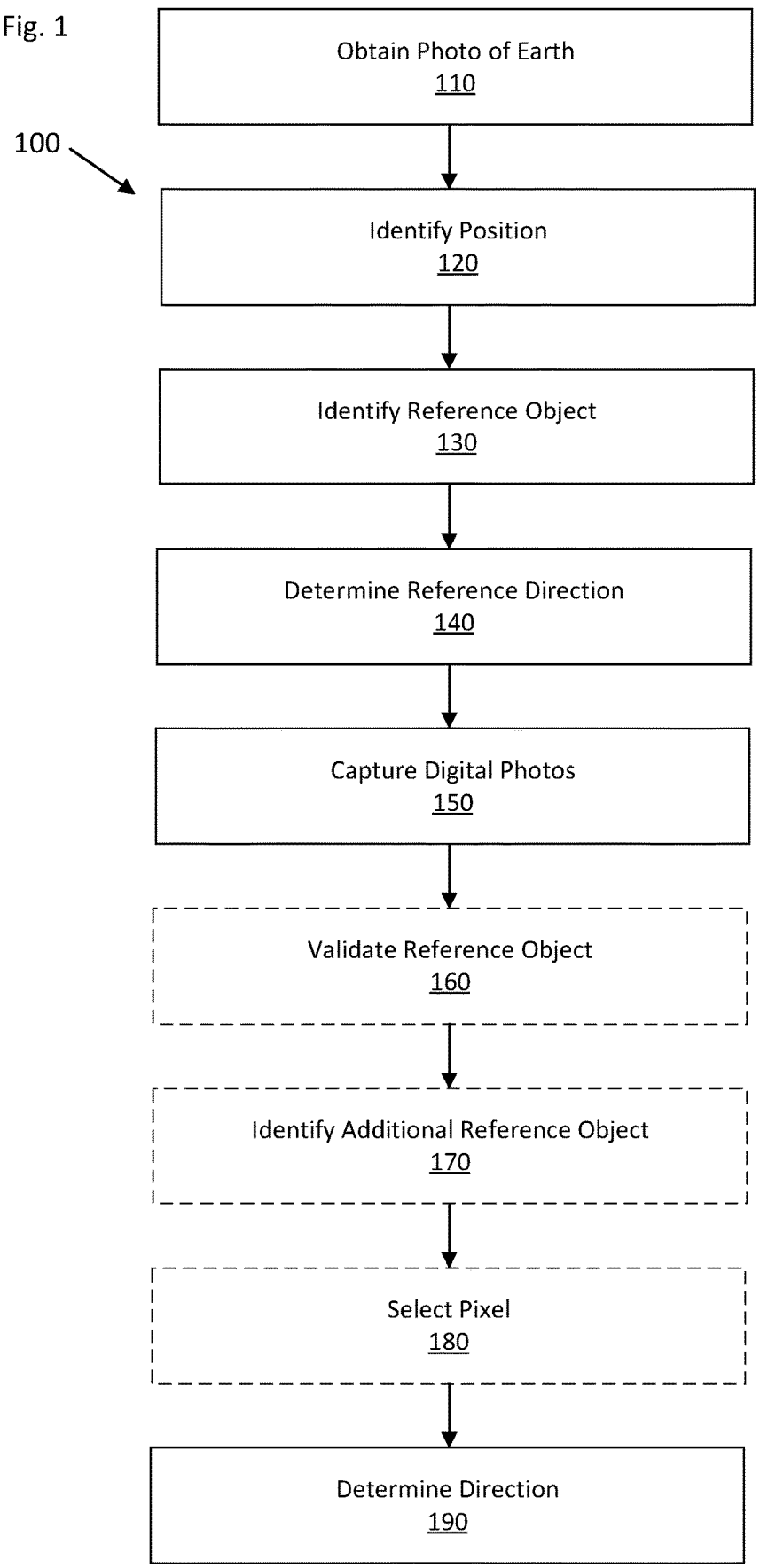
FIG. 1 shows schematically a method for determining a direction at a position.

Throughout the figures, same reference numerals refer to same parts, concepts, and/or elements. Consequently, what will be said regarding a reference numeral in one figure applies equally well to the same reference numeral in other figures unless not explicitly stated otherwise.

FIG. 1 shows the method 100 for determining a direction at a position.

The method 100 comprises
obtaining 110 an orthorectified photo of a region of Earth's surface and a corresponding coordinate system for the region in said orthorectified photo;
identifying 120 the position in the orthorectified photo, thereby determining a set of coordinates corresponding to the position;
identifying 130 a reference object in the orthorectified photo, thereby determining a set of coordinates corresponding to the reference object;
determining 140 a reference direction between the position and the identified reference object based on the corresponding sets of coordinates;
capturing 150 at least one digital photo at the position with a calibrated digital camera, wherein at least one of the at least one captured digital photo depicts the reference object;
determining 190 the direction based on the at least one captured digital photo and the reference direction, wherein the determined direction is based on at least one pixel's coordinates corresponding to the depicted reference object in said captured digital photo.

Performing the step of determining the direction 190 may require detailed knowledge regarding how the captured digital photos were captured, such as the field of view, relative camera orientation, camera location and/or how the image plane maps the world frame. The calibrated digital camera relates to a camera device for which the optical properties and sensor properties are known. With a calibrated digital camera the direction of light incident on a specific area corresponding to a pixel of a sensor, such as a charge-coupled device (CCD) image sensor, may be determined in relationship to the camera orientation. The study of digital camera systems, the digital photo's they capture and the relationship between a pixel of a digital photo and the direction of light entering said camera systems is well known in the art and the corresponding numerical calculations is beyond the purview of this text. Throughout the description examples are used wherein the captured digital photos are assumed to be captured at substantially the same location, unless otherwise stated, and typically the difference between said captured example digital photos is in the orientation of the camera during capture. These assumptions were made to prioritize the intelligibility of said examples, however, the method for determining a direction at a position is not limited to use on stationary platforms.

It is to be understood that when carrying out the method 100, capturing 150 at least one digital photo at the position with a calibrated digital camera may be performed prior to obtaining 110 an orthorectified photo of a region of Earth's surface and a corresponding coordinate system for the region in said orthorectified photo.

In some embodiments identifying 120 the position in the orthorectified photo and/or identifying 130 the reference object in the orthorectified photo is based on user input. In some embodiments identifying 120 the position in the orthorectified photo and/or identifying 130 the reference object in the orthorectified photo is an automated process. In some embodiments identifying 120 the position in the orthorectified photo and/or identifying 130 the reference object in the orthorectified photo is based on at least one digital photo captured at the position and/or at a position adjacent to the position. In one example the position in the orthorectified photo is identified 120 based on an obtained set of digital photos that were captured at the position prior to initiating the method.

In some embodiments the method 100 comprises a step of verifying 160 the depicted reference object, wherein the depicted reference object in each captured digital photo is compared with the identified reference object in the orthorectified photo. In some embodiments the step of verifying 160 the depicted reference object further comprises determining a set of probability values indicative of the orthorectified photo and each captured digital photo representing the same reference object. In some embodiments verifying 160 the depicted reference object further utilizes rangefinder data of said depicted reference object(s) to verify the depicted reference object.

In some embodiments obtaining 110 an orthorectified photo of a region of Earth's surface comprises obtaining an image from a digital 3D model of Earth's surface.

In some embodiments the method 100 determines a direction in relation to the orientation of the digital camera, such as a direction for determining the bearing at the position. In some embodiments the method 100 comprises selecting 180 a pixel in a captured digital photo and the method 100 determines 190 a direction corresponding to said selected pixel and/or the absolute camera orientation at the time of capture of said captured digital photo. In some embodiments comprising the step of selecting 180 a pixel, the direction to any object captured in a captured digital photo depicting the reference object may be directly determined based on the reference direction and the pixel coordinates of a pixel of the depicted reference object in said captured digital photos. This way a direction of interest to a target object depicted in a captured digital photo depicting the reference object may be determined directly based on the determined reference direction and the relationship between pixel coordinates of the captured digital photo.

In some embodiments selecting 180 the pixel comprises selecting a plurality of pixels, and determining 190 the direction comprises determining a central direction for the plurality of pixels. As one example the plurality of pixels are all the pixels in a captured digital photo corresponding to an object of interest, such as a hostile vehicle, and the determined central direction is the directions towards a pixel that has the average pixel position of said plurality of pixels.

In some embodiment determining 190 the direction further comprises determining a virtual protractor based on the at least one captured digital photo, wherein the virtual protractor defines angular relationships between pixel coordinates in the at least one captured digital photo.

In some embodiments of the method 100 comprises
capturing 150 at least two digital photos at the position and obtaining a set of angular differences between relative camera orientations for said captured digital photos,
selecting 180 a pixel in a captured digital photo, and wherein determining 190 the direction, if the selected pixel is in a captured digital photo not depicting the reference object, is further based on the set of obtaining angular differences between said captured digital photos. In this way a direction of interest to a target object depicted in a captured digital photo may be determined, even if the reference object and target object are not depicted in the same captured digital photo, by utilizing the obtained obtaining angular differences between captured digital photos, thereby forming a relationship between pixel coordinates in different captured digital photos.

In some embodiments the method further comprises identifying 170 at least one additional depicted reference object upon capturing 150 the at least one digital photo at the position, wherein identifying 170 the at least one additional reference object utilizes the captured digital photo depicting the reference object, the captured digital photo depicting the additional reference object, and the orthorectified photo. Identifying 170 each additional reference object may further utilize any previously determined direction towards the reference object or any other additional reference objects.

In some of these embodiments identifying 170 at least one additional depicted reference object further comprising determining for each identified additional depicted reference object a reference direction, and wherein determining a direction 190 is further based on the at least one additional depicted reference object and corresponding determined reference direction(s), and/or based on the determined reference direction.

The step of verifying 160 the depicted reference object, the steps of identifying 170 additional reference objects upon capturing 150 at least one digital photo, and the step of selecting 180 a pixel corresponding to the direction to be determined in the at least one captured digital photo are optional steps that may be combined.

In some embodiments the method 100 is intended for use with the digital camera in a substantially horizontal orientation, such as to capture at least part of the horizon. In some of these embodiments the method 100 is intended for capturing multiple photos with the digital camera substantially in one plane of rotation, such as panning the camera along the horizon.

In some embodiments capturing 150 at least one digital photo further comprises determining a downward direction of the digital camera during capture of said digital photo, such as a direction towards the centre of mass of Earth. In some of these embodiments the method 100 is arranged to determine the relative orientation of the digital camera based on said downward direction. In some of these embodiments determining 190 the direction is further based on said downward direction.

In some embodiment capturing 150 at least one digital photo comprises substantially simultaneously capturing a plurality of digital photos with a plurality of digital cameras. In some of these embodiment at least some digital cameras may be mounted in fixed relative orientation in relation to each other. In some of these embodiment at least some digital cameras may be mounted in on an actuator, wherein the actuator is arranged to provide information indicative of the pose of said digital camera. Simultaneously capturing a plurality of digital photos may be advantageous for performing the method 100 on a moving platform.

In some embodiments the method 100 is a method for determining a direction at a ground and/or sea-level position. In some embodiments the method 100 is a method for determining a direction at a position in the air. In some embodiments the method 100 is a method for determining a direction at an underwater position.

Figure 2A:
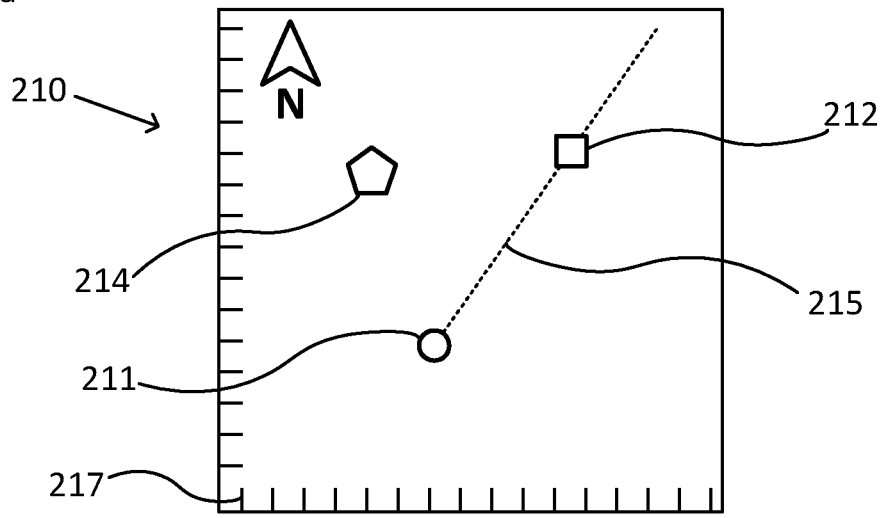
FIG. 2a depicts schematically an orthorectified photo of a region of Earth's surface.
Figure 2B:
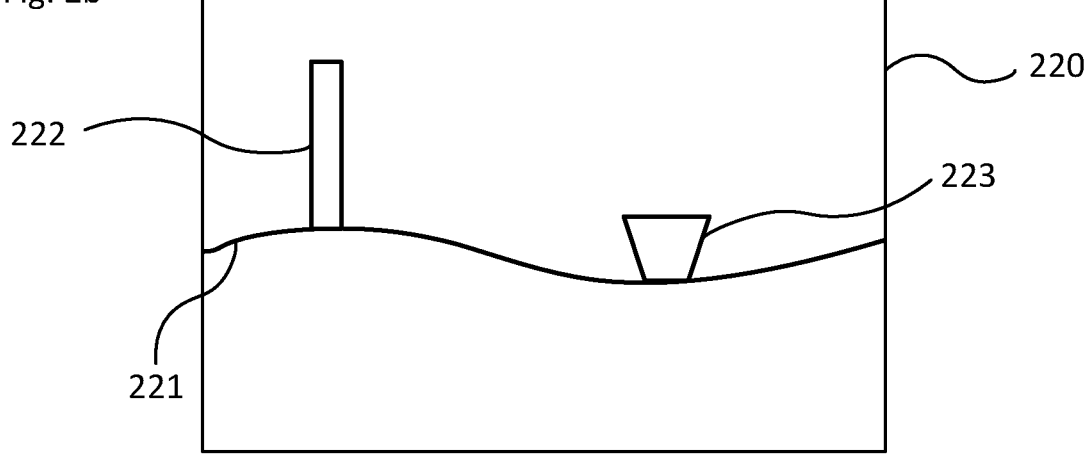
FIG. 2b-c depict schematically digital photos captured from a positon.
Figure 2C:
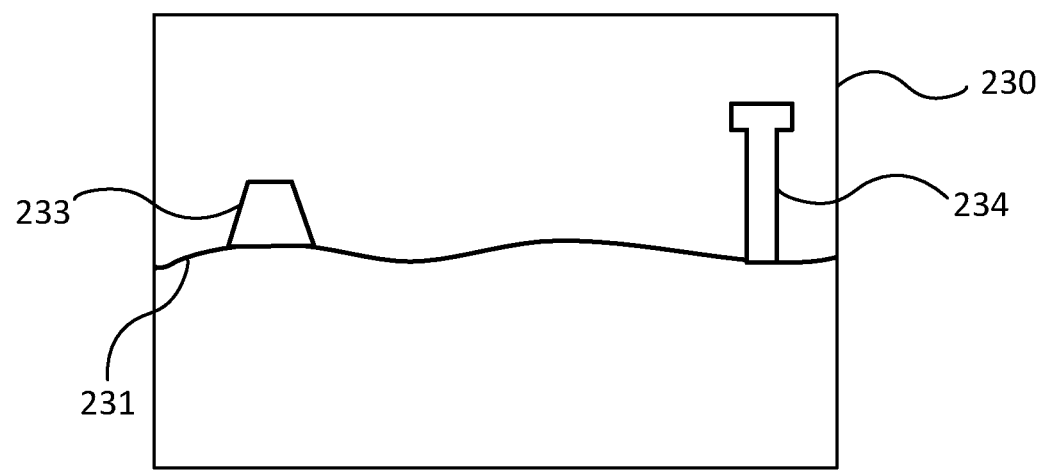

FIG. 2a depicts schematically an orthorectified photo 210 and FIG. 2b-c depicts schematically captured digital photos 220,230. The example orthorectified photo's 210 orientation, scale and corresponding coordinates are known, thus said orthorectified photo 210 may function as a reference map. The absolute camera orientation during capture of the captured digital photo's 220,230 is typically initially unknown, however, a relative camera orientation during capture may be known, such that the angular difference between the relative camera orientations corresponding to two captured digital photos 220,230 may be determined. The two types of photos 210,220,230 and corresponding photo information is utilized by the method to determine the direction to be determined at the position. The direction to be determined may be a direction for determining bearing, such as finding north, or the direction may be a direction towards an object depicted in a captured digital photo 220,230.

FIG. 2a depicts schematically an example orthorectified photo 210 comprising the position 211 from which a direction is to be determined, an identified reference object 212, an additional reference object 214, and a reference direction 215 between the position 211 and the identified reference object 212. The orthorectified photo 210 is of a region of Earth's surface.

In the example in FIG. 2a the position 211, reference object 212, additional reference object 214, and reference direction 215 have already been identified or determined in the orthorectified photo 210, however, upon obtaining the orthorectified photo 210 it may only comprise a orthorectified photo of the region of Earth's surface and a corresponding coordinate system 217. In the example in FIG. 2a the corresponding coordinate system 217 is represented by coordinate axes at the bottom side and the left side of the orthorectified photo 210. In some examples the coordinate system 217 corresponding to the region comprises coordinate data mapping points in the orthorectified photo 210 to coordinates of said region.

The identified reference object 212 may be selected based on an expected visibility of said reference object 212 from the position 211. In some embodiments an automatic process is configured to be more likely to select a determined tall structure surrounded by plains as the identified reference object 212 over a determined low-rise structure surrounded by forest. In some embodiments the orthorectified photo 210 comprises a coordinate system 217 corresponding to the coordinates of the region, in FIG. 2a the coordinate system 217 is represented by axes with ticks and a north arrow. In some embodiments the orthorectified photo 210 is based on information obtained prior to initiating the method, such as from a memory storage comprising orthorectified photo data and/or a model of Earth's surface generated by a computer application.

FIG. 2b depicts schematically a captured digital photo 220 captured at the position. The captured digital photo 220 depicts a horizon 221 separating a terrain in the lower part and the sky in the upper part; a reference object 222; and a target object 223. The captured digital photo 220 is captured with a calibrated digital camera with known optical properties, thereby the angles between incidental light reaching its pixels may be determined. The captured digital photo 220 further relates to a relative camera orientation indicative of camera orientation during capture. The captured digital photo 220 may further relate to a relative camera position indicative of camera position during capture. The relative camera position may be the position 211. The relative camera orientation may be utilized to determining the angular difference between the captured digital photos 220, thereby allowing an angular relationship between pixels in different captured digital photos 220 to be determined. The target object 223 may depict a vehicle, building or other object of interest. In this example the target object 223 may be indicative of an object of interest to determine a direction towards, such as a hostile vehicle. In this example the reference object 222 depicts the same reference object 212 as depicted in FIG. 2a.

Based on the orthorectified photo 210 in FIG. 2a and the captured digital photo 220 in FIG. 2b the direction to the target object 223 may be determined. The direction to the depicted reference object in FIG. 2b corresponds to the reference direction 215 in FIG. 2a, whereby the direction to the target object 223 may be calculated based on the angular relationship between pixels in the captured digital photo 220 in FIG. 2b and the reference direction 215. The orthorectified photo 210 in FIG. 2a and the captured digital photo 220 in FIG. 2b may be utilized to determine the bearing at the position, such as the north direction.

FIG. 2c depicts schematically a captured digital photo 230 captured at the position. The captured digital photo 230 depicts a horizon 231 separating a terrain in the lower part and the sky in the upper part; an additional reference object 234; and an additional target object 233. The captured digital photo 230 is captured with a calibrated digital camera with known optical properties, thereby the angles between incidental light reaching its pixels maybe determined. The captured digital photo 230 further relates to a relative camera orientation indicative of camera orientation during capture. The captured digital photo 230 may further relate to a relative camera position indicative of camera position during capture. The relative camera position may be the position 211. The relative camera orientation may be utilized to determining the relative camera orientation between captured digital photos 230, thereby allowing a relationship between pixels in different captured digital photos 230 to be determined. The depicted additional reference object 214, 234 represents an object identifiable in both the captured digital photo 230 and the orthorectified photo 210.

Based on the orthorectified photo 210 in FIG. 2a, the captured digital photo 220 in FIG. 2b, and the captured digital photo 230 in FIG. 2c, the direction to the additional target object 233 in FIG. 2c may be determined. The direction to the depicted reference object in FIG. 2b corresponds to the reference direction 215 in FIG. 2a; and the direction to the additional target object 233 in FIG. 2c may be calculated based on the direction to the depicted reference object 222 in FIG. 2b and the angular difference between the relative camera orientations of the captured digital photos 220,230. If the captured digital photos 220,230 were captured at different positions then calculating the direction may be further based on a determined positional difference between the relative camera position of each captured digital photo 220,230.

Based on the information relating to the orthorectified photo 210 in FIG. 2a, the captured digital photo 220 in FIG. 2b, and the captured digital photo 230 in FIG. 2c may be utilized to identify additional reference objects 214,234 in the captured digital photos 220,230 and corresponding reference directions (not shown). This may be performed by determine the direction to the depicted reference object 222 in FIG. 2b and thereafter determine the direction to the depicted additional reference object 234 in FIG. 2c; thereafter comparing the depicted additional reference object 234 with the additional reference object 214 in the orthorectified photo 210; and, upon match, determine a reference direction (not shown) from the position 211 to the additional reference object 214 in the orthorectified photo 210. Searching in a set of captured digital photos comprising a depiction of the reference object 222 may allow a plurality of additional reference objects 214,234 to be identified, wherein at least some additional reference objects 214,234 were to determined to be too unreliable to serve as the initially used reference object 212.

Identifying multiple reference objects 222,234 may allow the direction to be determined with a set of captured digital photos 220,230 containing any of the additional reference objects 234. Alternatively a set of captured digital photos 220,230 depicting a plurality of reference objects 222,234 may utilize at least two reference objects 222,234 to provide improved reliability and/or accuracy in determining the direction.

Figure 3:
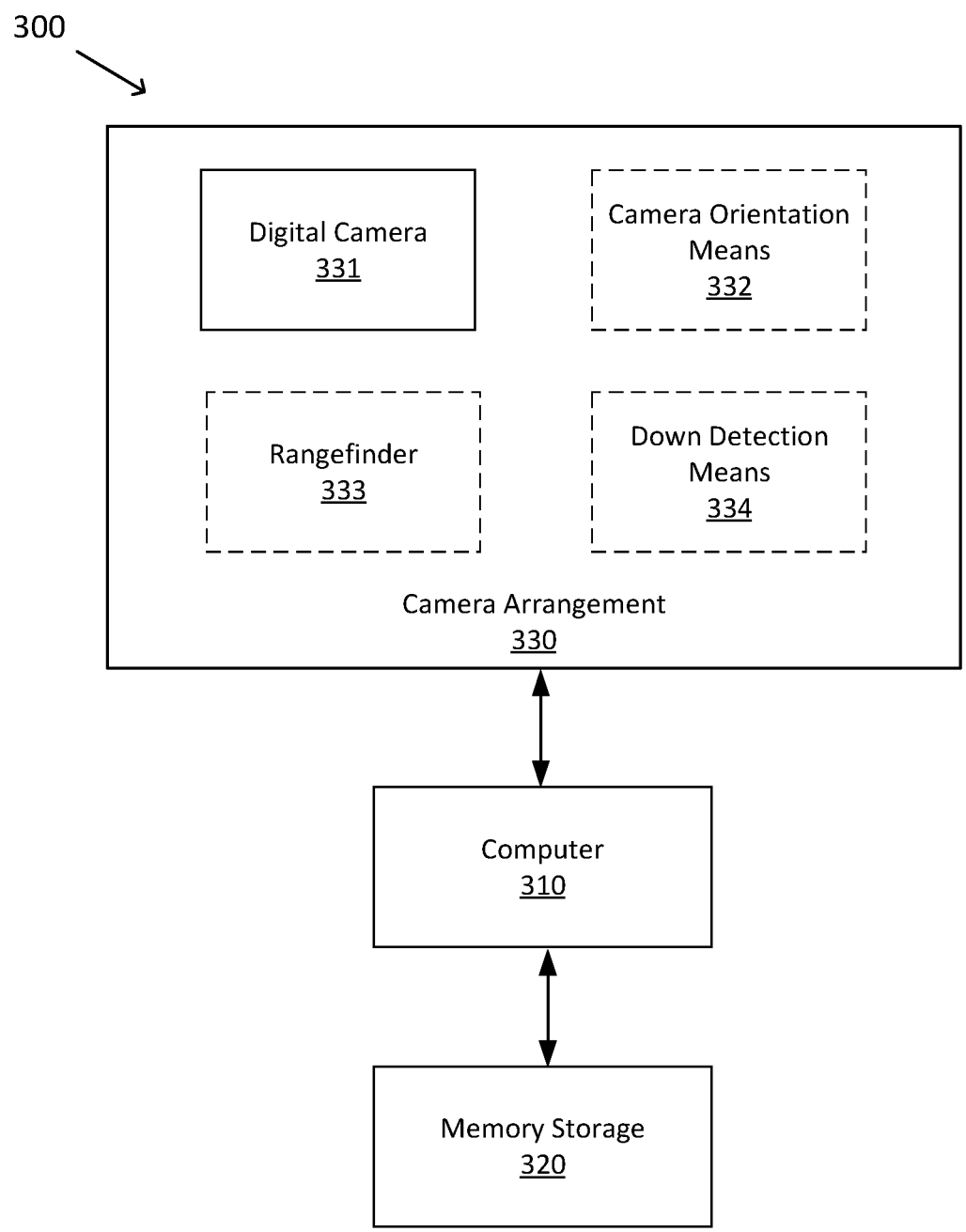
FIG. 3 shows schematically a system for determining a direction at a position.

FIG. 3 shows schematically a system for determining a direction at a position. The example system 300 comprises a computer 310, a memory storage 320 and camera arrangement 330 comprising a digital camera 331. The computer 310 is arranged to communicate with the memory storage 320 and the digital camera 331. The digital camera 331 is a calibrated digital camera arranged to capture a digital photo, and provide said photo to the computer 310. The memory storage 320 is arranged to store data indicative of orthorectified photos of parts of Earth's surface and corresponding coordinate systems for said orthorectified photos.

The computer 310 is arranged to
- obtain an orthorectified photo of a region of Earth's surface and a corresponding coordinate system for the region in said orthorectified photo;
- obtain a position in the orthorectified photo, thereby determining a set of coordinates corresponding to the position;
- identify a reference object in the orthorectified photo, thereby determining a set of coordinates corresponding to the reference object;
- determine a reference direction between the position and the identified reference object based on the corresponding sets of coordinates;
- capture a digital photo at the position by controlling the digital camera 331;
- determine the direction based on the reference direction and the captured digital photo(s), wherein at least one captured digital photo depicts the reference object, wherein the determined direction is based on the pixel coordinate corresponding to the depicted reference object in said captured digital photo.

The memory storage 320 and computer 310 may be arranged to generate a computer model to obtain an orthorectified photo of a region of Earth's surface and a corresponding coordinate system for the region in said orthorectified photo.

The computer 310 may be arranged to obtain the position in the orthorectified photo based on user input.

The computer 310 may be arranged to identify the reference object in the orthorectified photo based on user input.

The computer 310 may be arranged to identify the reference object in the orthorectified photo based on a determined probability of at least part of the reference object being visible from the position.

In some embodiments the system 300 comprises camera orientation means 332, wherein said camera orientation means 332 are in communication with the computer 310 and are arranged to change the relative orientation of the digital camera 331.

In some embodiments the system 300 comprises a rangefinder 333, such as a laser rangefinder, arranged to determine the distance to objects in the field of view of the digital camera 331 and to determine a distance to at least one such object during capture of a digital photo. In some of these embodiments the rangefinder 333 is arranged at the digital camera 331.

In some embodiments comprising a rangefinder 333, the computer 310 is arranged to validate the depicted reference object by comparing the depicted reference object in at least one digital photo and the identified reference object in the orthorectified photo based on the corresponding range data.

In some embodiments the system 300 is intended for use with the digital camera 331 in a substantially horizontal orientation, such as to capture at least part of the horizon. In some of these embodiments the system 300 is intended for capturing multiple photos with the digital camera 331 substantially in one plane of rotation, such as panning the camera along the horizon.

In some embodiments the system 300 comprises down detection means 334, arranged to provide a downward direction of the digital camera 331 during capture, such as a direction towards the centre of mass of Earth. In some of these embodiments the system 300 is arranged to determine the relative orientation of the digital camera 331 based on said downward direction. In some of these embodiments the computer 310 is arranged to determine the direction based on said downward direction.

In some embodiments the system 300, the camera arrangement 330 comprises the camera orientation means 332 and/or the rangefinder 333 and/or the down detection means 334. In some of these embodiments the computer 310 is arranged to control the camera orientation means 332 to orients the digital camera 331 and the rangefinder 333.

In some embodiment the system 300 comprises a plurality of digital cameras 310, whereby multiple digital photos may be captured simultaneously. In some of these embodiment at least two digital cameras 310 may be mounted in fixed relative orientation in relation to each other, such that the angular difference between relative camera orientations of said digital cameras remain the same. In some embodiments at least some digital cameras 310 are mounted in on actuators, wherein said actuators are arranged to provide information indicative of the pose of said digital camera 310. The embodiments of the system 300 able to capture multiple digital photos simultaneously may be advantageous for systems 300 mounted on moving platforms. The embodiments of the system 300 able to capture multiple digital photos simultaneously with digitals cameras 310 in known relative orientations may be advantageous for mounting on small mobile platforms, such as a drone.

It is to be understood that at least two digital cameras 310 that may be mounted in fixed relative orientation may be the sensor element of one digital camera 310 receiving incident light via a plurality of significantly different light paths, such that the captured digital photo comprises the equivalent of a plurality of digital photos captured by digital cameras at different relative orientations.

In some embodiments the system 300 is arranged to determining a direction at a ground and/or sea-level position. In some embodiments the system 300 is a ground-based and/or seacraft based system. In some embodiments the system 300 is arranged to determining a direction at a position in the air. In some embodiments the system 300 is comprised in an aerial system, such as a drone. In some embodiments the system 300 is arranged to determining a direction at an underwater position. In some embodiments the system 300 is comprised in an underwater system, such as a submarine.

In some embodiments the system 300 is comprised in a flying platform, wherein the flying platform is arranged to wirelessly transmit a direction determined by the system 300.

Figure 4:
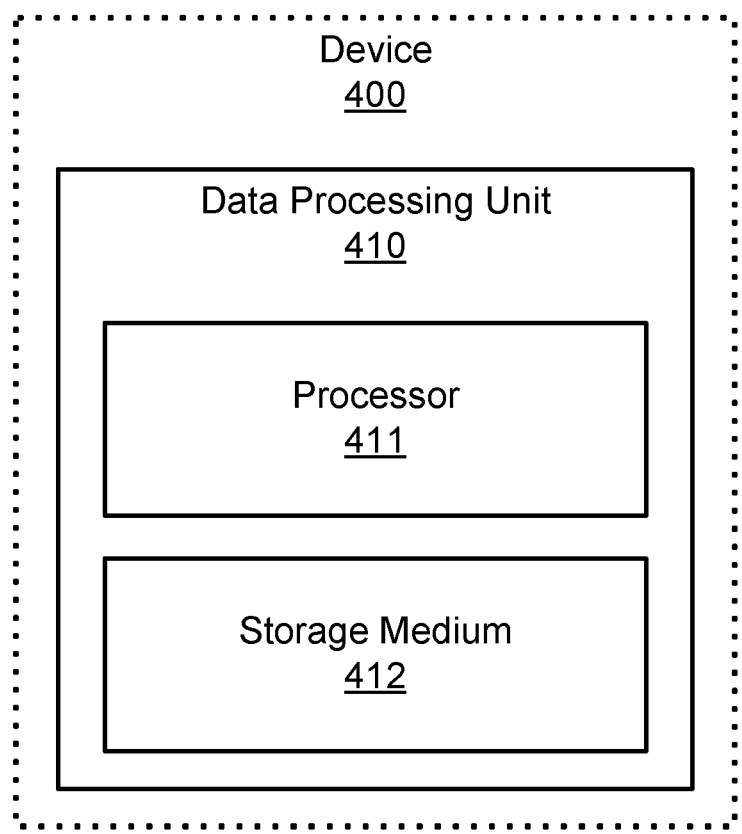
FIG. 4 depicts schematically a data processing unit comprising a computer program product.

FIG. 4 depicts schematically depicts a data processing unit comprising a computer program product for determining a direction at a position. FIG. 4 depicts a data processing unit comprising a computer program product comprising a non transitory computer-readable storage medium 412. The non-transitory computer-readable storage medium 412 having thereon a computer program comprising program instructions. The computer program is loadable into a data processing unit 410 and is configured to cause a processor 411 to carry out the method determine a direction at a position in accordance with the description of FIG. 1.

The data processing unit 410 may be comprised in a device 400. In some examples, the device 400 is the computer and/or memory storage comprised in system for determining a direction at a position described in FIG. 3.

The device 400 may be a computer and/or control circuitry.

The device 400 may be comprised in a vehicle.

The device 400 may be comprised in an aircraft.

The device 400 may be comprised in a watercraft.

The device 400 may be part of a system for determining a direction at a position in a vehicle.

The device 400 may be part of a system for determining a direction at a position in an aircraft.

Returning to FIG. 2a-c and FIG. 3, an example scenario using systems 300 for determining a direction at a position will be described. In said example scenario a drone (flying platform) serves as a forward observer by determining and providing a direction towards a target to a weapon aiming system.

In the example scenario the weapon aiming system comprises a first systems 300 for determining a direction at a weapon, such as an artillery piece. The first systems 300 for determining a direction provides a direction, such as north, at said weapon in a coordinate system. In this example said first systems 300 for determining a direction provides the weapon aiming system with a direction based on a digital photo 220 of a reference object 222 that is used to determine the orientation of the weapon in relation to the coordinate system.

In the example scenario the drone comprises a second system 300 for determining a direction towards a target 223,233 from the drone in said coordinate system. The second system 300 for determining a direction comprises two digital cameras 310 each controlled by camera orientation means 332. Said orientation means 332 are arranged to provide the relative orientation of the cameras 310. The drone is configured to attempt to track a reference object 222 with one camera 310 and to track a target 223,233 with the other camera 310, thereby increasing the probability of simultaneous capture of a digital photo 220 depicting a reference object 222 and a digital photo 220,230 depicting a target 223,233.

In the example scenario the drone approaches a location from which line-of-sight with the target is expected. During the approach the drone has established a communication link with the weapon aiming system. The weapon aiming system has determined the orientation of the weapon in the coordinate system based on a direction provided by the first systems 300 for determining a direction.

As the drone is about to reach said location, the second system 300 for determining a direction captures digital photos 220,230 along the horizon. In this example scenario the first digital camera 310 captured a digital photo depicting a reference object, and the second systems 300 for determining a direction is configured to track and keep capturing digital photos of said reference object.

As the drone reaches the location from which line-of-sight with the target is expected, the second systems 300 for determining a direction captures simultaneous pairs of digital photos 220,230, attempting to capture a pair of digital photos 220,230 comprising the reference object 222 with the first digital camera 310 and capture a digital photo 220,230 comprising the target 223,233 with the second digital camera 310.

Upon capturing a simultaneous pair of photos 220,230 depicting the reference object 222 and the target 223,233, the second systems 300 for determining a direction utilizes the relative camera orientation and said pair of digital photos 220,230 to determine the direction to the target 223,233 from where the pair of digital photos 220,230 were captured. The direction in the coordinate system is then transmitted from the drone to the weapon aiming system, whereby a weapon main be aimed at the target.

The invention claimed is:

1. A method (100) for determining a direction at a position (211), the method (100) comprises obtaining (110) an orthorectified photo (210) of a region of Earth's surface comprising the position (211), and a corresponding coordinate system for the region in said orthorectified photo (210), identifying (120) the position (211) in the orthorectified photo (210), and determining a set of coordinates corresponding to the position (211), identifying (130) a reference object (212) in the orthorectified photo (210), thereby determining a set of coordinates corresponding to the reference object (212), determining (140) a reference direction (215) between the position (211) and the identified reference object (212) based on the corresponding sets of coordinates, capturing (150) at least one digital photo (220;230) at the position (211) with a calibrated digital camera (331), wherein at least one of the at least one captured digital photo (220) depicts the reference object (222), selecting (180) a pixel in the at least one digital photo (220;230) corresponding to the direction to be determined, and determining (190) the direction based on the at least one captured digital photo (220;230) and the determined reference direction (215), wherein the determined direction is based on at least one pixel coordinate corresponding to the depicted reference object (222) in the at least one captured digital photo (220) depicting the reference object (222), and wherein determining (190) the direction comprises utilizing the pixel coordinate of the selected pixel to determine (190) the direction corresponding to said selected pixel.

2. The method according to claim 1, wherein capturing (150) at least one digital photo (220;230) comprises obtaining for each captured digital photo (220;230) a relative camera orientation, and wherein, if the selected pixel is in a digital photo (230) lacking a depiction of the reference object (222), determining (190) the direction corresponding to said selected pixel is further based on said obtained relative camera orientations of said photo and at least one of the at least one captured digital photo (220) depicting the reference object (222).

3. The method according to claim 1, wherein selecting (180) the pixel comprises selecting a plurality of pixels, and wherein determining (190) the direction comprises determining a central direction based on said plurality of pixels.

4. The method according to claim 1, wherein determining (190) the direction further comprises determining a virtual protractor based on the at least one captured digital photo (220;230), wherein the virtual protractor defines angular relationships between pixel coordinates in the at least one captured digital photo (220;230).

5. The method according to claim 1, further comprising identifying (170) at least one additional depicted reference object (234) upon capturing (150) the at least one digital photo at the position, wherein identifying (170) the at least one additional reference object (234) utilizes the captured digital photo (220) depicting the reference object (222), the captured digital photo (230) depicting the additional reference object (234), and the orthorectified photo (210).

6. The method according to claim 5, wherein:
identifying (170) at least one additional depicted reference object (234) further comprising determining for each identified additional depicted reference object (234) a reference direction, and
determining (190) a direction is further based on the at least one additional depicted reference object (234) and corresponding determined reference direction(s), and/or based on the determined reference direction (215).

7. The method according to claim 1, wherein capturing (150) at least one digital photo (220;230) further comprises at least obtaining range data corresponding to the reference object (212), and wherein the method (100) further comprises validating (160) the reference object by comparing the reference object (212) depicted in at least one digital photo (220,230) and the orthorectified photo (210) based on the corresponding range data.

8. A computer program product comprising a non-transitory computer-readable storage medium (412) having thereon a computer program comprising program instructions, the computer program being loadable into a processor (411) and configured to cause the processor (411) to perform the method (100) for determining a direction at a position (211) according to claim 1.

9. System (300) for determining a direction at a position, the system (300) comprises
a computer (310),
a memory storage (320), and
a camera arrangement (330) comprising a digital camera (331),
wherein the digital camera (331) is a calibrated digital camera arranged to capture digital photos (220;230),
wherein the camera arrangement (330) is arranged to determine a relative orientation of the digital camera (331) during capture,
wherein the memory storage (320) comprises at least one orthorectified photo (210) of a region of Earth's surface and corresponding coordinate system for the region in said orthorectified photo (210), and
wherein the computer (310) is arranged to:
obtain an orthorectified photo (210) of the region of Earth's surface and the corresponding coordinate system for the region in said orthorectified photo (210),
determine the position (211) in the orthorectified photo (210), thereby determining a set of coordinates corresponding to the position (211),
identify a reference object (212) in the orthorectified photo (210), thereby determining a set of coordinates corresponding to the identified reference object (212),
determine a reference direction (215) between the position (211) and the identified reference object (212) based on the corresponding sets of coordinates,
capture and obtain at least one digital photo (220;230) at the position (211) by controlling the digital camera (331),
select a pixel in the at least one digital photo (220;230) corresponding to the direction to be determined, and
upon obtaining at least one captured digital photo (220) depicting the reference object (222), determine the direction based on said captured digital photo (220; 230) and the reference direction (215), wherein determining the direction is based on pixel coordinates of at least one pixel corresponding to the depicted reference object (222) in said captured digital photo (220), and the determined reference direction, and wherein determining the direction comprises utilizing the pixel coordinate of the selected pixel to determine the direction corresponding to said selected pixel.

10. The system according to claim 9, further comprising a rangefinder (333), wherein the rangefinder (333) is arranged to provide range data indicative of the distance to objects in the field of view of the digital camera during capture of a digital photo (220,230), and the computer (310) is arranged to validate the depicted reference object (222) by comparing the depicted reference object (222) in at least one digital photo (220,230) and the identified reference object (212) in the orthorectified photo (210) based on the corresponding range data.

11. The system according to claim 9, comprising a plurality of digital cameras (310), wherein at least two digital cameras (310) are arranged in a fixed relative orientation in relation to each other.

12. A vehicle comprising the system (300) for determining a direction according to claim 9.

13. A method (100) for determining a direction at a position (211), the method (100) comprises
obtaining (110) an orthorectified photo (210) of a region of Earth's surface comprising the position (211), and a corresponding coordinate system for the region in said orthorectified photo (210),
identifying (120) the position (211) in the orthorectified photo (210), and determining a set of coordinates corresponding to the position (211),
identifying (130) a reference object (212) in the orthorectified photo (210), thereby determining a set of coordinates corresponding to the reference object (212),
determining (140) a reference direction (215) between the position (211) and the identified reference object (212) based on the corresponding sets of coordinates,
capturing (150) at least one digital photo (220;230) at the position (211) with a calibrated digital camera (331), wherein at least one of the at least one captured digital photo (220) depicts the reference object (222) and wherein the capturing (150) of the at least one digital photo (220;230) further comprises at least obtaining range data corresponding to the reference object (212),
determining (190) the direction based on the at least one captured digital photo (220;230) and the determined reference direction (215), wherein the determined direction is based on at least one pixel coordinate corresponding to the depicted reference object (222) in the at least one captured digital photo (220) depicting the reference object (222), and
validating (160) the reference object by comparing the reference object (212) depicted in at least one digital photo (220,230) and the orthorectified photo (210) based on the corresponding range data.

* * * * *